US006216013B1

United States Patent
Moore et al.

(10) Patent No.: US 6,216,013 B1
(45) Date of Patent: Apr. 10, 2001

(54) COMMUNICATION SYSTEM WITH HANDSET FOR DISTRIBUTED PROCESSING

(75) Inventors: Iain Charles Moore, Cheshire; Christopher William Henderson Ellis, Leamington Spa, both of (GB)

(73) Assignee: Cable & Wireless PLC, London (GB)

( * ) Notice: Subject to any disclaimer, the term of this patent is extended or adjusted under 35 U.S.C. 154(b) by 0 days.

(21) Appl. No.: 09/441,353

(22) Filed: Nov. 16, 1999

Related U.S. Application Data

(62) Division of application No. 08/398,761, filed on Mar. 6, 1995.

(30) Foreign Application Priority Data

Mar. 10, 1994 (GB) .................................................. 9404620
Dec. 21, 1994 (GB) .................................................. 9425836

(51) Int. Cl.[7] .................................................. H04Q 7/20
(52) U.S. Cl. ........................ 455/557; 455/563; 455/566
(58) Field of Search .............................. 455/90, 403, 550, 455/556, 557, 563, 566; 704/246, 273, 275

(56) References Cited

U.S. PATENT DOCUMENTS

| 5,189,632 | * | 2/1993  | Paajanen et al.   | 455/556 |
| 5,218,188 | * | 6/1993  | Hanson            | 455/575 |
| 5,260,989 | * | 11/1993 | Jenness et al.    | 455/553 |
| 5,422,656 | * | 6/1995  | Allard et al.     | 455/556 |
| 5,546,538 |   | 8/1996  | Cobbley et al. .  |         |
| 6,125,284 | * | 9/2000  | Moore et al.      | 455/557 |

FOREIGN PATENT DOCUMENTS 0 423 800 A2   4/1991  (EP) .
0 564 201 A2  10/1993  (EP) .

OTHER PUBLICATIONS

Brodersen, "A Portable Multimedia Terminal"; IEEE Communication Magazine; 0163–6804/92 pp. 64–75, Dec. 1992.*
IBM Technical Disclosure Bulletin, May 1991.
GEM–786–Graphics Environment Manager on the Intel 82786 Database Inspec. Online—Institute of Electrical Engineers.

* cited by examiner

Primary Examiner—Nay A. Maung
(74) Attorney, Agent, or Firm—Robert D. Schaffer; Clifford Chance Rogers & Wells LLP

(57) ABSTRACT

A communication system, comprising at least one mobile handheld telephone handset adapted to communicate with a telephone network handling system. The handset comprises means to produce first signals dependent thereupon, means to produce a voice transmission signal and means to transmit the voice transmission signal. The handset also comprises first processing means to carry out a speech recognition process to produce initial feature analysis parameter coefficients data dependent thereupon. The first processing step preserves predetermined information. The handset further comprises means to produce a data transmission. The telephone network handling system comprises means to receive the voice signal, means to forward the voice signal, and means to receive and process the data transmission signal. The telephone handling system also comprises means to carry out the remote second processing step in a speech recognition process on the regenerated data.

3 Claims, 3 Drawing Sheets

COMMUNICATION SYSTEM WITH HANDSET FOR DISTRIBUTED PROCESSING

This application is a division of Ser. No. 08/398,761 filed Mar. 6, 1995.

FIELD OF THE INVENTION

The present invention relates to a communication system.

DESCRIPTION OF THE PRIOR ART

Systems such as Personal Digital Assistants, or PDAs are known which provide a variety of applications including a diary, address book and computer applications such as wordprocessing and spreadsheets. PDAs are effectively "shrunken computers"—ie. they aim to provide the functionality of a desktop PC in a handheld device by using miniaturized components. Recent attempts have also been made to incorporate communication features into a conventional PDA, by adding mobile phone and/or fax capabilities.

However, since a conventional PDA contains all systems and applications software/hardware onboard, the scope of the device is severely restricted due to size, processing capability and power supply limitations.

SUMMARY OF THE INVENTION

In accordance with a first aspect of the present invention, we provide a communication system comprising at least one mobile handheld telephone handset adapted to communicate via a wireless telephony medium with a telephone network handling system;

wherein the handset comprises means to receive input from a user and produce signals dependent thereupon, means to adapt speech input to produce a voice transmission signal as part of a telephone conversation with a third party; and means to transmit the voice transmission signal via the wireless telephony medium; and wherein the telephone network handling system comprises means to receive the voice transmission signal, and means to forward the voice signal to a third party;

characterized in that the handset further comprises first processing means adapted to carry out a first processing step on selected input signals and produce data dependent thereupon which preserves predetermined information necessary to carry out a remote second processing step, means to adapt the data according to a conventional wireless telephony protocol to produce a transmission signal, and means to transmit the transmission signal via the wireless telephony medium to the telephone network handling system; and in that the system further comprises means to receive and process the transmission signal from the telephone network handling system to regenerate the data, and second processing means positioned remote from the handset and adapted to carry out a second processing step on the data, and to produce an output dependent thereupon.

The system according to the present invention provides a means of delivering potentially unlimited processing power to a mobile handset, since the remote processor (which is generally fixed) is not limited by size or power consumption requirements.

The present invention typically includes a wireless telephone device for use in an associated wireless telephony network environment (with the conventional "telephony" features of means to adapt speech input as part of a conventional telephone conversation with a third party), along with the additional feature of further processing distributed between the handset and a remote processor which may be used in a variety of alternative applications. This enables effective human to computer interaction over a wireless telephony medium by providing means in the handset to carry out a first processing step which, while processing, for example compressing, the input signals enough to enable acceptably error free transmission over the wireless telephony network, also preserves key information which is required to carry out a remote second processing step in a central processor, or remotely running application. Typically, the telephone network handling system comprises a wide area cellular network which utilises the GSM (General Standard Mobile) protocol, (with an associated bandwidth for data transmission of 9.6 KBps). Alternatively, it may comprise the DCS 1800 or DECT (Digital European Cordless Telephony) environments.

The telephone network handling system is typically a circuit switched system providing real-time communication between the handset and the third party (in the case of a telephone conversation), and between the first and second processing means (in the case of data transmission). This may be contrasted with a "packet switched" or "message switched" communication environment which can only be used for data transmission.

Typically the means to process outgoing speech input for transmission and incoming voice signals for audio output comprises a modem, and may also further comprise a codec in the case of digital transmission.

The first and second processing steps may be consecutive steps in a speech recognition system. For instance, the first processing step in the handset may be the first step in a speech recognition process, and the second processing step may comprise the remaining steps in the speech recognition process, providing text/instructions as the output.

Typically the first processing step in the speech recognition process produces an output which retains key features of the input speech to allow the speech recognition process to be completed in a remote central server, while also conforming with the bandwidth limitation of the wireless telephony medium (9.6 KBbs in the case of GSM).

Typically the first step in the speech recognition process comprises an initial feature analysis which converts the input speech signals according to a known algorithm (such as linear predictive coding) into parameter coefficients. The second processing step which is carried out in a remote central processor typically comprises comparing the received parameter coefficients to a library of known sub-word units (such as phonemes, sub-phonemes or tri-phones) followed by further analysis against lexical, syntactic and semantic models to provide output text/instructions.

The output from the central processor may be returned to the handset for display in the form of text, and may also be input as instructions to a further, remotely processed application which accepts text as input.

The approach to voice processing recognizes that significant resources, both in terms of processing power and data storage, are required by state-of-the-art recognition engines. Rather than delivering a compromise solution through miniaturization (as is the case with PDAs), limited in both vocabulary range and performance, the handset supports the initial stages of voice recognition processing, i.e. the initial feature analysis, on the handset, and passes the results, now sufficiently reduced in volume to fit the restricted data channel bandwidth offered by mobile/cordless networks, to a large, powerful, multi-user recognition engine located centrally.

Alternatively, the first and second processing steps may be separate processes in a fax transmission system, or first and second analyzing steps in a handwriting recognition system, similar to the speech recognition system.

In the case of a handwriting recognition system, text may be input to the handset via a touch sensitive screen and transmitted to the central processor using a standard facsimile protocol (or any other protocol which provides an appropriately high quality transfer method such that essential features in the written text are not lost). The central processor then carries out a handwriting recognition procedure on the fax data to interpret the handwriting and return it to the handset as recognized text.

In a further alternative, the first and second processing steps may be used in a "remote desktop" application in which the handset acts as a remote input/output device for a computer. The first processing step typically comprises converting input from the user (for instance cursor control instructions) into object-level graphics code, tailored for a particular operating system (such as MS-Windows™, Macintosh™ or any other object-oriented graphical interface) installed on a remote PC. The code is modulated according to the required wireless protocol and transmitted, via the telephone network handling system, to the remote PC. In this case the remote processor is contained in the PC, which decodes the object-level graphics code and inputs the instructions to a running application.

Built-in intelligence in the handset identifies the input activity on an object basis, and transmits only a coded-representation of the object manipulation to the remotely executing application. Taking the example of drawing a line using a pointing device, the handset determines the type of object being input, in this case a line, and its properties (starting and ending co-ordinates, thickness, colour, etc.) which can then be transmitted in coded form to the application. The device drivers associated with the remotely-executing application decode the input by reference to a standard object library (which mirrors that held locally on the handset), and pass this into the application with no appreciable delay. The representation of the line shown on screen is generated locally by the handset, and only altered if the remote application dictates a change. To the user, the result is instantaneous response.

In this case the application functionality available to the handset user is not limited by the capabilities of the on-board processor. In the "remote desktop" application, by communicating with and remotely controlling an application executing elsewhere, the handset delivers the power of that remote processor to the mobile user.

Further, most users of the handset will already have a suite of applications, tailored to their information requirements, resident on their existing desktop PC. With the handset delivering access to all these resources from any location, there is no need for additional application software on the handset, with its cost and support implications, nor is a complex configuration exercise necessary in order to establish connections to a range of information sources.

As a further development of the "remote desktop" concept, a multi-user computer, capable of running application software which is commonly found on a personal computer, is located remotely within a telephone network. That is, the multi-user computer provides application execution capability to a large population of remote users as and when they need it. Handset users who are familiar with personal computer applications, but do not have an appropriately configured personal computer to access, can run these applications within a "virtual PC" environment on the multi-user node. This mechanism can deliver the benefits of personal computer applications to a handset user without requiring the capital outlay associated with a personal computer purchase.

In accordance with a second aspect of the present invention, we provide a communication system comprising at least one mobile handheld telephone handset adapted to communicate via a wireless telephony medium with a telephone network handling system;

wherein the handset comprises means to receive input from a user and produce signals dependent thereupon, means to adapt speech input to produce a voice transmission signal as part of a telephone conversation with a third party; and means to transmit the voice transmission signal via the wireless telephony medium; and wherein the telephone network handling system comprises means to receive the voice transmission signal, and means to forward the voice signal to a third party;

characterized in that the handset is adapted to transmit and receive input/output data via the wireless telephony medium and the telephone network handling system whereby the handset acts as an input/output device for an application program executing on a computer positioned remote from the handset and attached to the telephone network handling system.

As previously described, the computer may be a desktop personal computer (PC) or a computer providing a parallel multi-user environment.

Again, the telephone network handling system is typically a circuit switched system. The limited bandwidth capabilities of the wireless telephony medium are typically overcome by converting input/output into an object-level graphics description protocol for transmission.

BRIEF DESCRIPTION OF THE DRAWINGS

An example of the present invention will now be described with reference to the accompanying Figures in which.

EMBODIMENT

Figure 1:
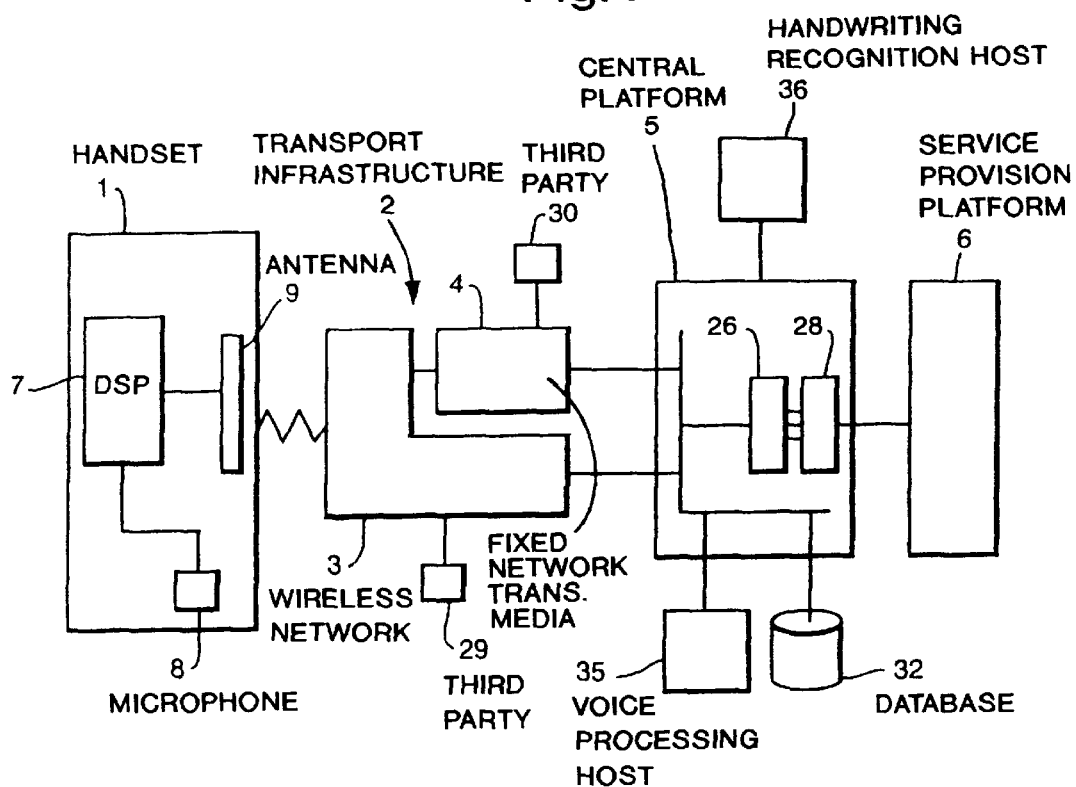
FIG. 1 illustrates a handset with associated network architecture.

The network architecture is shown in FIG. 1, and comprises four key functional entities: handset 1; transport infrastructure 2 (signalling and bearer channels) comprising wireless 3 and fixed network transmission media 4; central processing, formatting and control platform 5; and service provision platform 6. Item 6 is a generic entity representing assorted service provision platforms, which might include a store-and-forward fax server, interactive banking service or electronic mail access facility.

A single processor 7 in the handset 1 is responsible for an overall control function, data processing and transaction functions associated with on-board applications, and DSP functions. The processor is typically a RISC based processor which offers high flexibility i.e. the chip power can be used for radio, computing applications, DSP or split between all these. The handset also supports a 16 KHz microphone 8 with noise cancellation, and antenna 9. From hereon the processor 7 will be referred to as DSP 7, to differentiate it from other processors which will be described.

Figure 2:
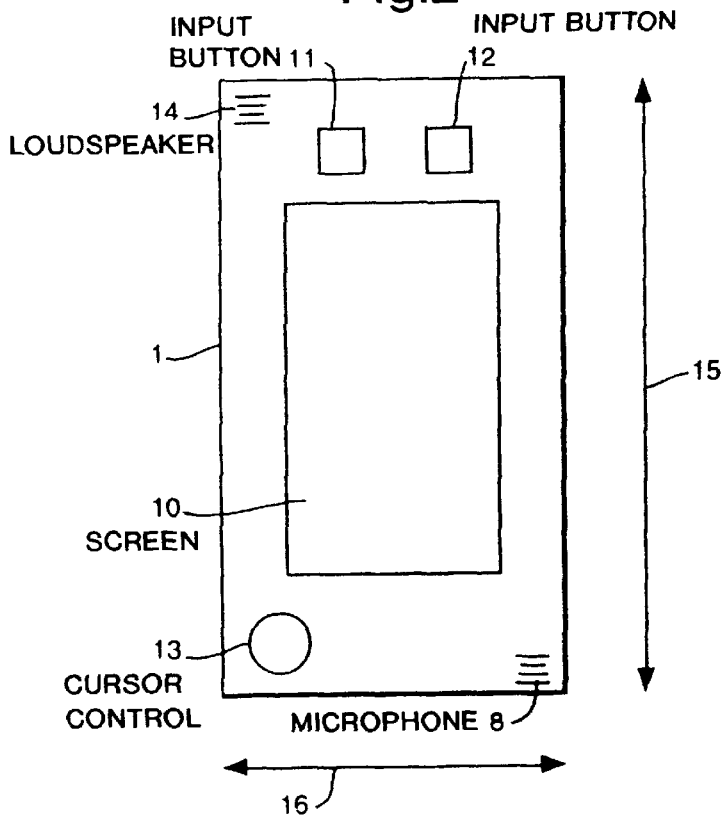
FIG. 2 shows the exterior of the handset, with typical user input/output devices.

The handset also comprises input and output devices as shown in FIG. 2 for interaction with a user. The handset comprises LCD display screen 10 for displaying fax, E-mail, menu options and other visual output. As can be seen in FIG. 2, the area of the screen 10 occupies a significant proportion of the area of the handset 1 which is presented to the user. The handset also comprises input buttons 11,12 and a cursor control 13, along with the telephone microphone 8 and loudspeaker 14 which are positioned for optimal ear-to-mouth spacing. Typical dimensions of the handset are a length 15 of 170 mm, a width 16 of 70 mm and a depth (not shown) of 23 mm. This allows the handset to be easily held in the hand. The handset also comprises an antenna (not shown) which is integrated into the case and does not require extension for operation.

The handset 1 may communicate with any conventional wireless communication environment 3, such as GSM 900 or DCS 1800. Alternatively, in a cordless system the mobile handset may communicate with a cordless (for instance DECT) base station. Apart from routing calls between the handset 1 and central platform 5, the transport infrastructure 2 may also set up telephone conversations between the handset 1 and a third party 29 or 30, either via other base stations in the wireless network 3, or via the PSTN 4 respectively.

The central platform 5 typically comprises a presentation manager 26. The presentation manager 26 is responsible for the management and control of the interface between the central platform 5 and the handset 1, and the acceptance of input from the device. The presentation manager 26 also formats the output from any of the service provision platforms, and interprets events which occur within the handset's interface. The central platform 5 also carries out a variety of functions, including processing of Email and fax data which is forwarded/received from the handset 1.

Multi-user database 32 is used to store data relating to each handset user.

Item 28 represents a generic "service proxy" capability, which forms part of the central platform 5. This offers the "expected" interface to a service provision platform 6, e.g. it emulates a VT100 terminal. Output is passed to the presentation manager 26 to be formatted for the handset, while events interpreted by the presentation manager 26 as requests to the service are appropriately translated and issued to the relevant platform 6.

Voice processing host 35, is configured to participate in a distributed speech recognition environment, and also incorporates voice synthesis capabilities to deliver audio output, such as prompts and instructions, to the handset user.

Handwriting recognition host 36 converts handwritten image data from the handset into text (described later).

A typical speech recognition application will now be described with reference to FIGS. 3 and 4.

Figure 3:
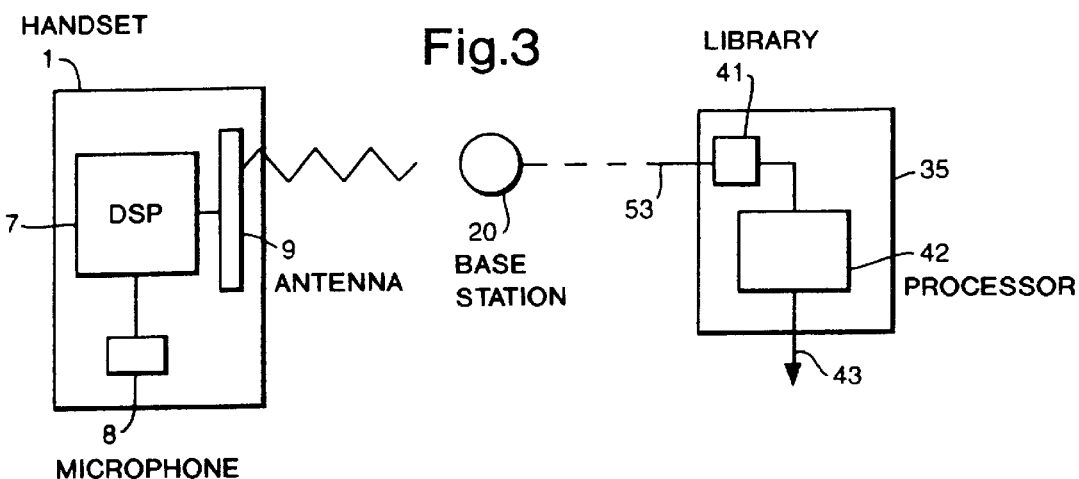
FIG. 3 illustrates the apparatus in a typical speech recognition process.

FIG. 3 shows the apparatus involved in a process of speech recognition. The first step in the speech recognition process is carried out in DSP 7 in the handset, and the remaining steps are carried out in voice processing host 35. The host 35 can deliver textual output in an appropriate format in a manner similar to the output of a keyboard. The host 35 is responsive to speech input derived from the handset 1 by recognizing speech units generated by the handset (eg. phonemes, sub-phonemes etc) and converting it into a textual representation.

As will be appreciated, the mobile handset 1 is remote from the host 35 and this has, in the past, formed a substantial barrier to the provision of a fully-responsive high-quality speech recognition system by way of the currently available telephone network.

As will be appreciated, in order to assist the host 35 in attending to the required fully-responsive and high-quality recognition process, the speech information provided to the host 35 should carry high fidelity information similar to that achieved with CD or DAT audio systems. This requires a bandwidth in the order of 22 Khz and, although the host 35 is available to process the information provided in such a bandwidth, the communication link formed between the handset 1 and the speech recognition apparatus 35 is not capable of providing such a bandwidth.

The invention overcomes this problem by carrying out a unique analysis and compression process on the speech information captured by way of the microphone 8. The analyzed and compressed data only requires a bandwidth of an order that is commonly offered by present networks, for example 9.6 Kbps. The analyzed and compressed data, once received by the host 35, is then used as a source for reconstructed speech data having an appropriately wide bandwidth, e.g. in the order of 22 Khz, which allows for the required high-quality recognition procedure to be carried out at the host 35.

Figure 4:
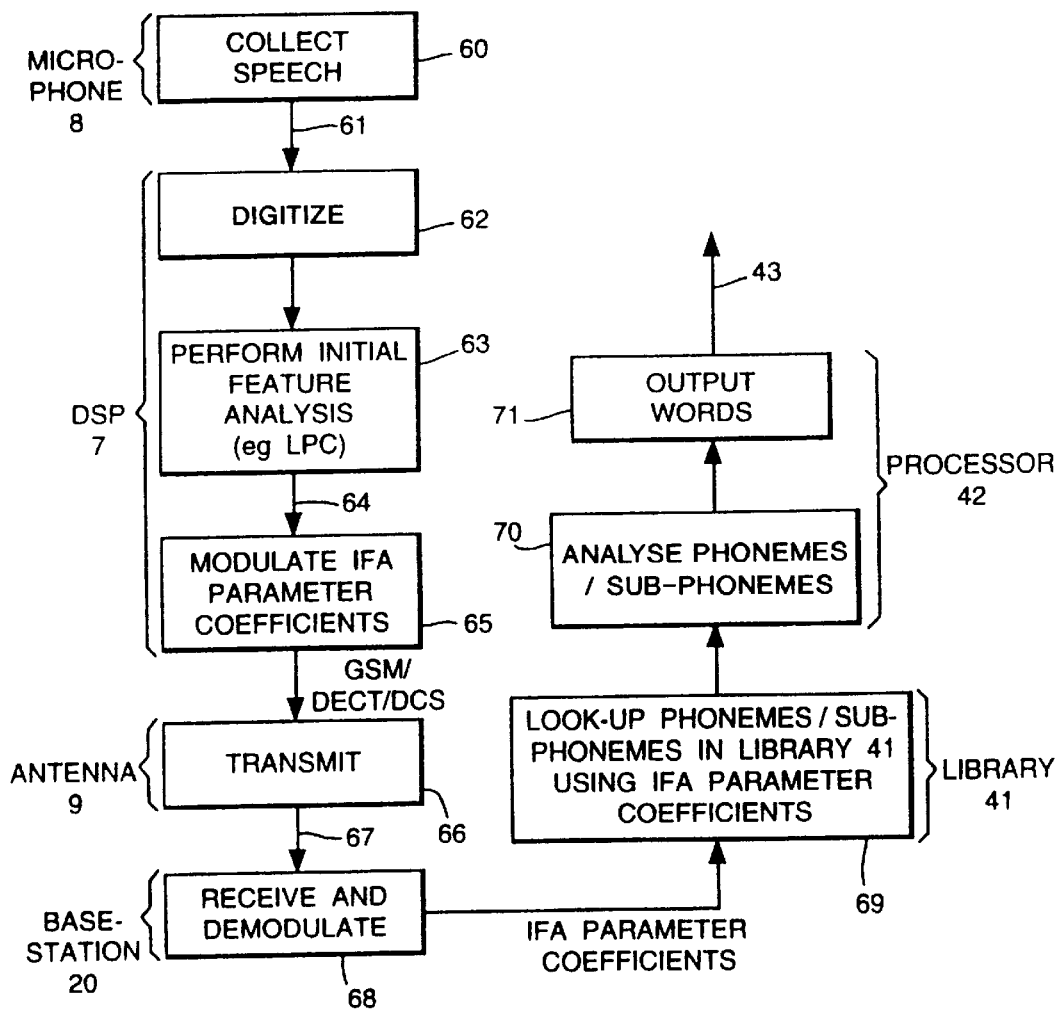
FIG. 4 is a flow diagram showing associated speech recognition steps.

FIG. 4 is a flow diagram illustrating the various steps which are carried out by the apparatus elements in FIG. 3.

The speech information that is to be subjected to the speech recognition process and subsequently to be employed as the control information for a remote system, is captured (step 60) by way of the microphone 8, having an appropriate transducer, and is fed to the DSP 7. The DSP 7 operates to capture and digitize the speech information (step 62) at high-fidelity levels with a bandwidth in the order of 22 Khz. Subsequently, initial feature analysis (step 63) of the digitized speech signal is carried out in the DSP 7. Typical algorithms which may be employed at this stage are linear predictive coding or filter-bank analysis. The algorithm is chosen to preserve the full range of input frequencies (up to approximately 16 KHz). This allows key features to be preserved after transmission, allowing detailed (for instance, dictation quality) speech recognition at the host 35. The output of initial feature analysis comprises a stream of parameter coefficients 64. These coefficients may be coded further by the DSP if required to comply with the bandwidth of the transmission medium (for instance by temporal decomposition interpolation in a step not shown in FIG. 4) and are then modulated at 65 in a conventional way to provide a radio transmission signal according to the required protocol (for instance GSM, DECT or DCS 1800). The transmission signal is then passed to antenna 9 which transmits the signal at 66.

The transmitted signal 67 is then received and radio demodulated in a conventional way by a base station 20 in the wireless telephone handling network 3 and is eventually passed as digital data (via a number of units indicated generally by dotted lines 53) to the host 35. Depending on which protocol is used, the transmitted data is received at a Private Branch Exchange (PBX) or a Mobile Switching Centre (MSC) before being delivered to the main communication network. The initial feature analysis parameter coefficients may have been regenerated in the previously described demodulation step. Alternatively, further decompression may be required by the host 35 to regenerate the initial feature analysis coefficients (if for example the coefficients had been coded by temporal decomposition interpolation).

The coefficients are then used to look up a library 41 of phonemes, sub-phonemes, diphones, tri-phones or other sub-word units, depending on what the coefficients represent. This is indicated at 69 in FIG. 4. The selected sub-word units are then analyzed by processor 42 at 70, which outputs text 71 which may be used in a number of ways. For instance, the textual output 43 may be retransmitted to the handset for display. In addition, the textual output may be used to provide input for a separately running application which recognizes textual input.

A typical speech recognition procedure has been outlined above, but in general any conventional speech recognition process may be used, with part of the process being carried out in the handset 1, and the rest in the central server 34. The division of tasks is determined to minimize loss of information and to optimize the use of the DSP 7.

In one specific embodiment, the step of initial feature analysis 63 may involve generating data that is representative of speech elements, (e.g. phonemes, sub-phonemes etc.) of the information digitized in the DSP 7. The following description shall describe the use of phonemes, although the speech elements may be sub-phonemes or tri-phones.

The data representative of the phonemes after encoding is arranged to be transmitted by the chosen protocol (e.g. DECT, GSM 900, DCS 1800 etc.). The DSP 7 contains a library of a large number of phonemes which can be stored on approximately 2 M bytes of ROM. The encoded data signal derived from the DSP 7 for transmission via the chosen protocols is a highly accurate representation of the complete speech information captured by way of the microphone 8. The compression of the speech information thereby achieved by way of the DSP 7 is of particular relevance since transfer of the encoded data requires a far narrower bandwidth than was initially required to capture the speech data by way of the microphone 8. In particular, the bandwidth of the encoded data falls within the bandwidth that is available for transmission via the chosen protocol and via the Network PSTN in general.

The encoded data representation of the phonemes is then transmitted through the network without suffering any undue degradation and is directed from the gateway 34 to the voice processing host 35. This host 35 includes a library of data relating to all possible phonemes and mirrors the library of the DSP 7.

Thus, upon receipt of the encoded data transmitted via the network from the handset 1, the host 35 is arranged to reconstruct the speech information by reference to the contents of its library. The recognition process can be then carried out on a relatively high-fidelity speech information having the bandwidth of 22 Khz.

The invention is particularly advantageous in that the speech recognition process eventually carried out in the host 35 is arranged to be speaker-specific since a smartcard level of user identification and security is inherent within the handset 1. As such, the central platform 5 and associated host 35 forms a powerful "recognition engine" which can be supplied with the necessary input information via the telephone network from a small and relatively inexpensive handset 1. Thus, the actual recognition procedure can be executed remote from such a handset and in an appropriate environment that corresponds to specialized test conditions.

Also, since the network sees the speech information merely as encoded data, full error correction and encryption can be applied where appropriate. Although this will cause response times to exceed the generally acceptable limit for conversational speech, such variations do not present a significant problem for speech recognition purposes in which mean delays of up to five seconds are generally considered acceptable. In any case, since phrases can be used as input instructions for information retrieval, greater delays, even of up to ten seconds, are regarded as reasonable. Primarily, a handset owner is provided with access to a speech recognition capability that would not be otherwise available from a handset, or from a laptop PC, and would be particularly and prohibitively expensive in a dedicated desktop machine.

Also, by virtue of the architecture of the present invention, the user of the handset 1 will be able to benefit directly from all improvements that are made to the central platform 5 and the host 35 as the related technology advances.

As illustrated in FIG. 1, the central platform 5 can provide for access of the data appearing on the network for other applications 6 which might require vocal, textual or numerical commands such as the service operations of banks and retailers or other dedicated services provided on the network, for example the so-called Wings applications provided by Mercury Communications Limited. The level of security and user identification inherent in the use of the DSP 7 as an analyzing and encoding device will prove particularly useful for such service operations.

The provision of such high-quality speech recognition by way of a handset 10 and the PSTN provides the basis for a particularly advantageous multi-media data processing system. For example the combination of voice response, speech recognition, speaker identification, text/image display, touch sensitive screen etc. provides for a system offering a wide variety of applications in a particular user-friendly and, responsive manner.

A "remote desktop" application of the present invention will now be described with reference to FIG. 5.

Existing protocols which support detached input/output require the transmission of a considerable amount of network traffic in order to complete, for example, the drawing of a line using a pointing device. The remotely executing application is supplied with input information reflecting each minute movement of the mouse, and responds with output instructions for each corresponding extension of the line to be displayed on the screen. In practice any attempt to implement this conventional architecture on a mobile network would deliver considerable, unacceptable delay between the input action, and the resulting output.

The "remote desktop" feature according to the invention allows the handset 1 to act as an input/output device for a remote desktop personal computer (PC), indicated generally at 50.

The handset 1 sets up a call with the PC via a local base station 20 associated with a particular wireless telephony network. The call is then forwarded to the PC via a telephone network handling system (indicated generally in dotted lines).

As well as displaying screen information, the handset receives input from a user and thus acts as a "remote control" for the PC 50. This is achieved over a limited bandwidth communication medium by the use of an object-level graphics description protocol which is optimized for low bit-rate utilization within the network which links the application (on the PC 50) and the handset 1.

The PC comprises a processor 51 which runs an application program 52 supported by the Windows operating system 53. The Windows operating system 53 receives input from a keyboard 54 and keyboard driver 55 which is typically converted into an object-level description protocol for input to the application program 52. Similarly, output from the application program 52 is converted into Windows object-level function calls with reference to the appropriate Windows libraries and output as function calls to screen driver 56 which drives the screen 57. The keyboard driver 55 and screen driver 56 are configured to input and output respectively information via a serial port 58 which is connected to a network adaptor 71 connection to a telephone network. For instance the adaptor 71 may be an ISDN terminal adaptor.

Figure 5:
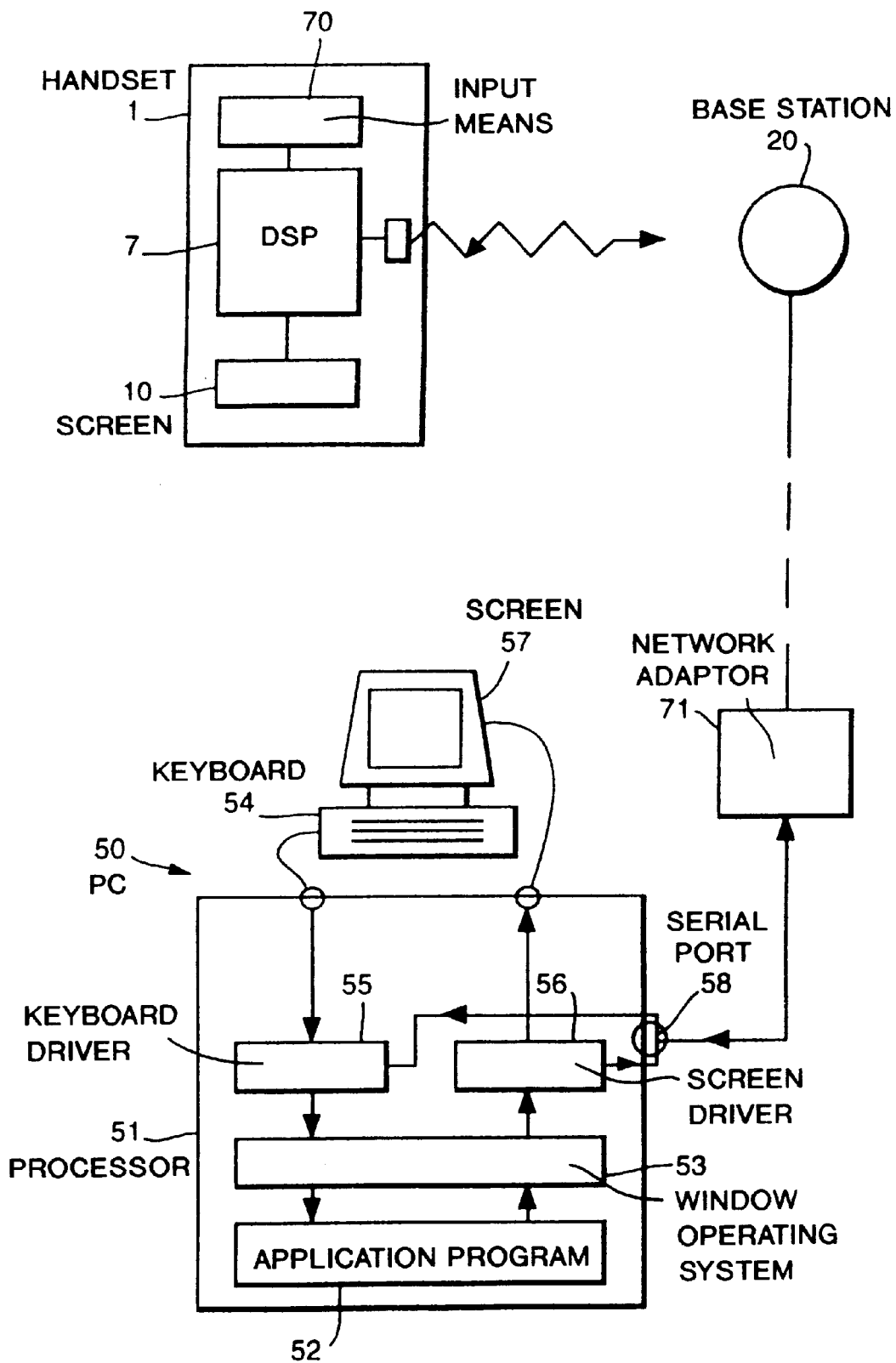
FIG. 5 illustrates the apparatus in a remote desktop aspect of the present invention.

The keyboard driver 55 and screen driver 56 may be configured by the PC manufacturer to divert input/output function calls to/from the serial port 58 (as shown in FIG. 5). Alternatively, a conventional PC may be adapted with a card inserted into the PC to enable the interface with the remote handset. In a further alternative, the PC 51 may be connected to a corporate server which has software which provides the interface between a number of PCs attached to it and the external telephone network.

Turning now to the handset 1, the DSP 7 receives input from input means generally indicated at 70 which may be the cursor control 13 or input from the touch sensitive screen 10. Built-in intelligence in the DSP 7 identifies the input activity on an object basis, and transmits only a coded representation (in appropriate Windows™ format) of the object manipulation to the remotely executing application. Taking the line drawing example outlined above, the DSP 7 would determine the type of object being input with reference to a Windows™ object library. In this case the DSP 7 determines that the object is a line, and also determines its properties (starting and ending coordinates, thickness, color etc) which can then be transmitted in coded form to the application. The keyboard and screen drivers 55,56 associated with the remotely executing application decode the input by reference to a standard object library (which mirrors that held locally on the handset) and pass this into the application with no appreciable delay. The representation of the line shown on screen is generated locally by the DSP 7, and only altered if the remote application 52 dictates a change. To the user the result is instantaneous.

When the remote application 52 dictates a change, screen driver 56 outputs the appropriate function call which is transmitted to the handset 1 via adaptor 71, and telephone network Base Station Controller 20. The DSP 7 receives the signal and processes it with reference to the stored standard object library. Appropriate output is then displayed on the screen 10.

Instead of accessing a conventional PC as shown in FIG. 5, the handset may access a "multi-user" which provides application execution capability to a large population of users in parallel, as and when they need it.

The use of the handset as an Input/Output and control device for a store-and-forward fax service will now be described.

A store-and-forward fax service acts as a mailbox for facsimile messages. A centrally connected node offers a line-terminating interface to which incoming fax messages are routed e.g. via call-forwarding or as part of an intelligent peripheral arrangement (such as Mercury's Wings platform).

These incoming faxes pass through the defined fax interface and are stored on disk in digital form. Receipt of the fax may trigger a notification process, alerting the user to the presence of new messages, via a pager message, for example.

Access to stored messages is traditionally achieved via a telephone handset DTMF interface, through which a suitable destination fax number is input by the user. On specification of the fax number, the mailbox is "unloaded", through conversion of the stored digital data across the defined fax interface, and transmission in analog form.

The handset's large, touch-sensitive screen allows it to act as a terminal for the input of handwritten or sketched faxes, while its scrolling display capability allows externally originating faxes to be read. In addition, the ability to participate in a distributed speech recognition environment will support spoken text or command input.

The combination of the handset and a store-and-forward fax service offers an effective solution to mobile faxing requirements. The gateway can receive large faxes on the user's behalf and alert the user via the handset's graphical user interface. This can indicate the sender's details (extracted from the fax header) along with the message size. A user can then choose to view the message on the handset's screen, scrolling down each page, or issue a command for the fax to be forwarded to a nearby fax machine if the message is large or a hard copy is required.

Using the touch sensitive screen, the user can annotate an incoming fax, perhaps signing it as authorization, for example, and return it to the sender or forward to another party. Re-trying busy numbers and forwarding to multiple destinations are features supported within the store-and-forward environment, thus reducing the amount of time required to process and reply to messages.

In most instances, the transfer of facsimile information between the handset and the service host will use a standard fax protocol. Group III fax is included within the GSM phase 2 standard, and is also supported within many other cellular and cordless environments. However, there is an opportunity for small messages, such as a screen-sized "fax note", to be transmitted via a proprietary protocol over a standard transport mechanism. As an example, Apple and Motorola have developed a compression standard which can represent "raw ink" (handwritten text and sketches) from an Apple Newton Message Pad screen in around 500 bytes, originally as part of their work on two-way paging around Asia.

Given that the SMS facility for out of band messaging within GSM and DCS 1800 (and the COMS facility within DECT) offers a throughput around 160 bytes per message, a fax note could be sent over 4 such messages. Using this method to move the fax representation from the handset to the service host would eliminate the expense of a switched bearer channel, and would also allow a call in progress to continue simultaneously.

A method of implementing a distributed handwriting recognition environment will now be described.

Conventional Personal Digital Assistants have attempted to allow text input via handwriting recognition. This process involves the use of local resources to interpret handwritten text entered on a touch-sensitive screen. Unfortunately, this has not performed particularly effectively.

The availability of more powerful remote processing resources, along with more extensive reference data, significantly improves the performance of the handwriting recognition process. Therefore a distributed system according to the invention, in which the handset gathers and presents data for processing by a centrally located host provides significant advantages.

In a similar fashion to the voice processing system described previously, the input data needs to be transmitted to the central resources without losing any features which contribute to the accuracy of processing. Handwriting can be recognized on the basis of dynamic features, and static graphic features. Dynamic features may be analyzed at the handset by the DSP 7, and transmitted to a remote handwriting recognition processor 36 along with graphic features.

Preferably the graphic features are transmitted via a protocol which retains predetermined features of the input handwriting signals to allow the handwriting recognition process to be completed in the remote processor.

Standard facsimile protocols offer an appropriately high quality transfer method for graphic features, such that the handset (or any other piece of equipment which conforms to standard facsimile standards) can deliver handwriting for recognition via fax, and display the recognized output.

We claim:

1. A communication system, comprising:

at least one mobile handheld telephone handset adapted to communicate via a wireless telephony medium with a telephone network handling system, wherein said handset comprises:
(a) means to receive input from a user and produce first signals dependent thereupon,
(b) means to adapt at least a portion of said first signals to produce a voice transmission signal as part of a telephone conversation with a third party, and
(c) means to transmit said voice transmission signal via said wireless telephony medium,
(d) first processing means adapted to carry out a first processing step in a speech recognition process on selected ones of said first signals and produce initial feature analysis parameter coefficients data dependent thereupon, wherein the first processing step preserves predetermined information necessary to carry out a remote second processing step,
(e) means to adapt said data according to a wireless telephony protocol to produce a data transmission signal, and
(f) means to transmit said data transmission signal via said wireless telephony medium to said telephone network handling system; and wherein said telephone network handling system comprises:
(a) means to receive said voice transmission signal,
(b) means to forward said voice transmission signal to said third party,
(c) means to receive and process said data transmission signal from said handset to regenerate said data, and
(d) second processing means positioned remote from said handset and adapted to carry out said remote second processing step in a speech recognition process on said regenerated data, and to produce second signals dependent thereupon;

wherein said selected first signals comprise speech signals and wherein said data transmission signal includes predetermined features of said input speech signals to enable said second processing means to carry out the remaining steps of said speech recognition process, and wherein said second signals comprise text signals representative of the textual content of said input, and said text signals are returned to said handset for output as text.

2. A communication system, comprising:

at least one mobile handheld telephone handset adapted to communicate via a wireless telephony medium with a telephone network handling system, wherein said handset comprises:
(a) means to receive input from a user and produce first signals dependent thereupon,
(b) means to adapt at least a portion of said first signals to produce a voice transmission signal as part of a telephone conversation with a third party, and
(c) means to transmit said voice transmission signal via said wireless telephony medium,
(d) first processing means adapted to carry out a first processing step in a speech recognition process on selected ones of said first signals and produce initial feature analysis parameter coefficients data dependent thereupon, wherein the first processing step preserves predetermined information necessary to carry out a remote second processing step,
(e) means to adapt said data according to a wireless telephony protocol to produce a data transmission signal, and
(f) means to transmit said data transmission signal via said wireless telephony medium to said telephone network handling system; and wherein said telephone network handling system comprises:
(a) means to receive said voice transmission signal,
(b) means to forward said voice transmission signal to said third party,
(c) means to receive and process said data transmission signal from said handset to regenerate said data, and
(d) second processing means positioned remote from said handset and adapted to carry out said remote second processing step in a speech recognition process on said regenerated data, and to produce second signals dependent thereupon, wherein said first and second processing means are adapted to carry out first and second processing steps in a handwriting recognition process.

3. A communication system comprising:

at least one mobile handheld telephone handset adapted to communicate via a wireless telephony medium with a telephone network handling system, wherein said handset comprises:
(a) means to receive input from a user and produce first signals dependent thereupon,
(b) means to adapt at least a portion of said first signals to produce a voice transmission signal as part of a telephone conversation with a third party, and
(c) means to transmit said voice transmission signal via said wireless telephony medium,
(d) first processing means adapted to carry out a first processing step in a speech recognition process on selected ones of said first signals and produce initial feature analysis parameter coefficients data dependent thereupon, wherein the first processing step reserves predetermined information necessary to carry out a remote second processing step,
(e) means to adapt said data according to a wireless telephony protocol to produce a data transmission signal, and
(f) means to transmit said data transmission signal via said wireless telephony medium to said telephone network handling system;

wherein said handset acts as a remote input device for a computer; and wherein said telephone network handling system comprises
- (a) means to receive said voice transmission signal,
- (b) means to forward said voice transmission signal to said third party,
- (c) means to receive and process said data transmission signal from said handset to regenerate said data, and
- (d) second processing means positioned remote from said handset and adapted to carry out said remote second processing step in a speech recognition process on said regenerated data, and to produce second signals dependent thereupon, wherein said first processing step comprises converting the selected first signals into object-level graphics code suitable for the computer.

* * * * *